March 18, 1947.  W. E. GRAY  2,417,410
DRAFT GEAR
Filed Sept. 2, 1944  3 Sheets-Sheet 2
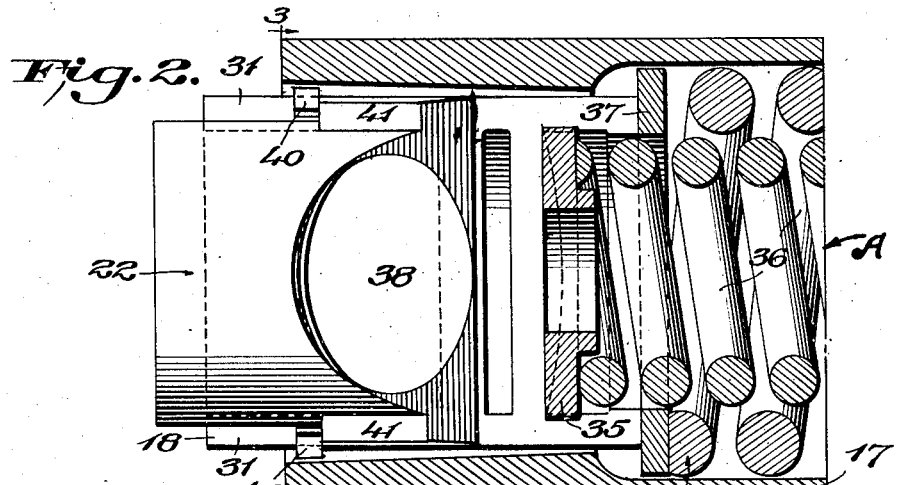
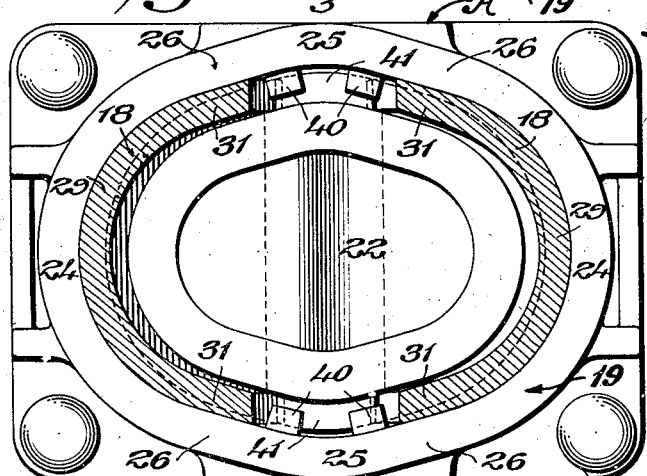
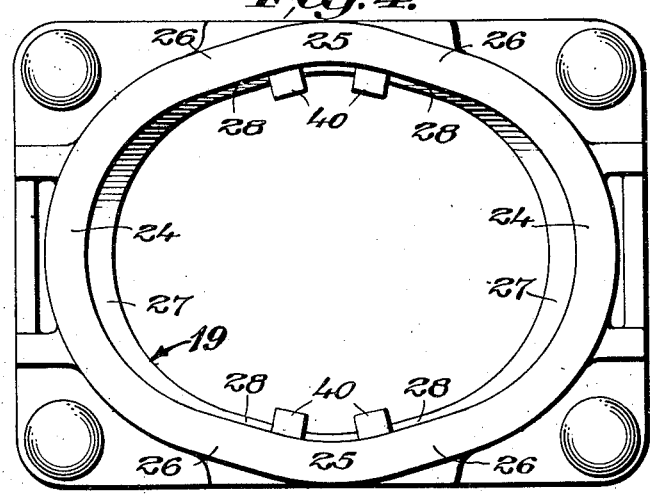
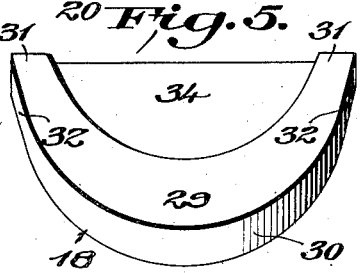
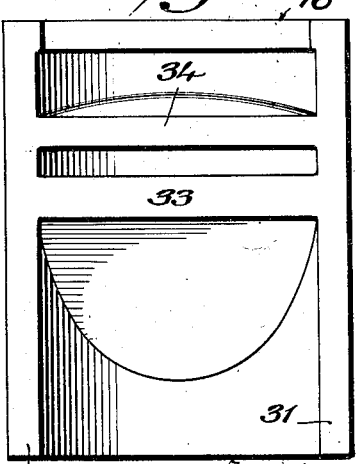
Inventor
W. E. Gray,
Emory L. Groff
Attorney March 18, 1947.  W. E. GRAY  2,417,410
DRAFT GEAR
Filed Sept. 2, 1944    3 Sheets-Sheet 3
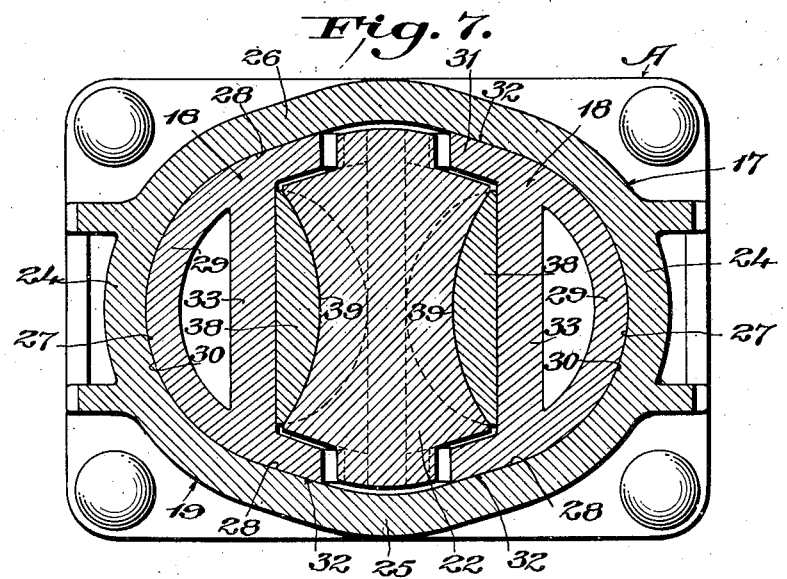
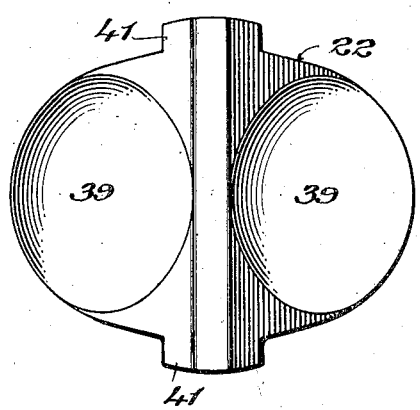 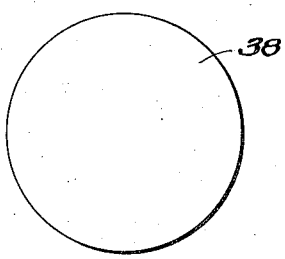 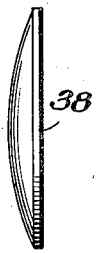
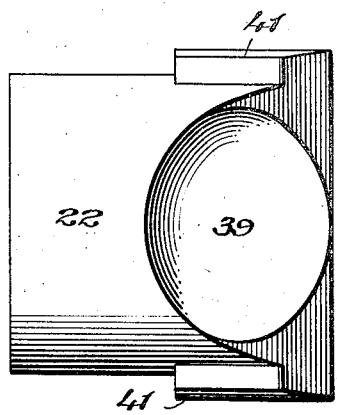
INVENTOR
W. E. Gray, Patented Mar. 18, 1947

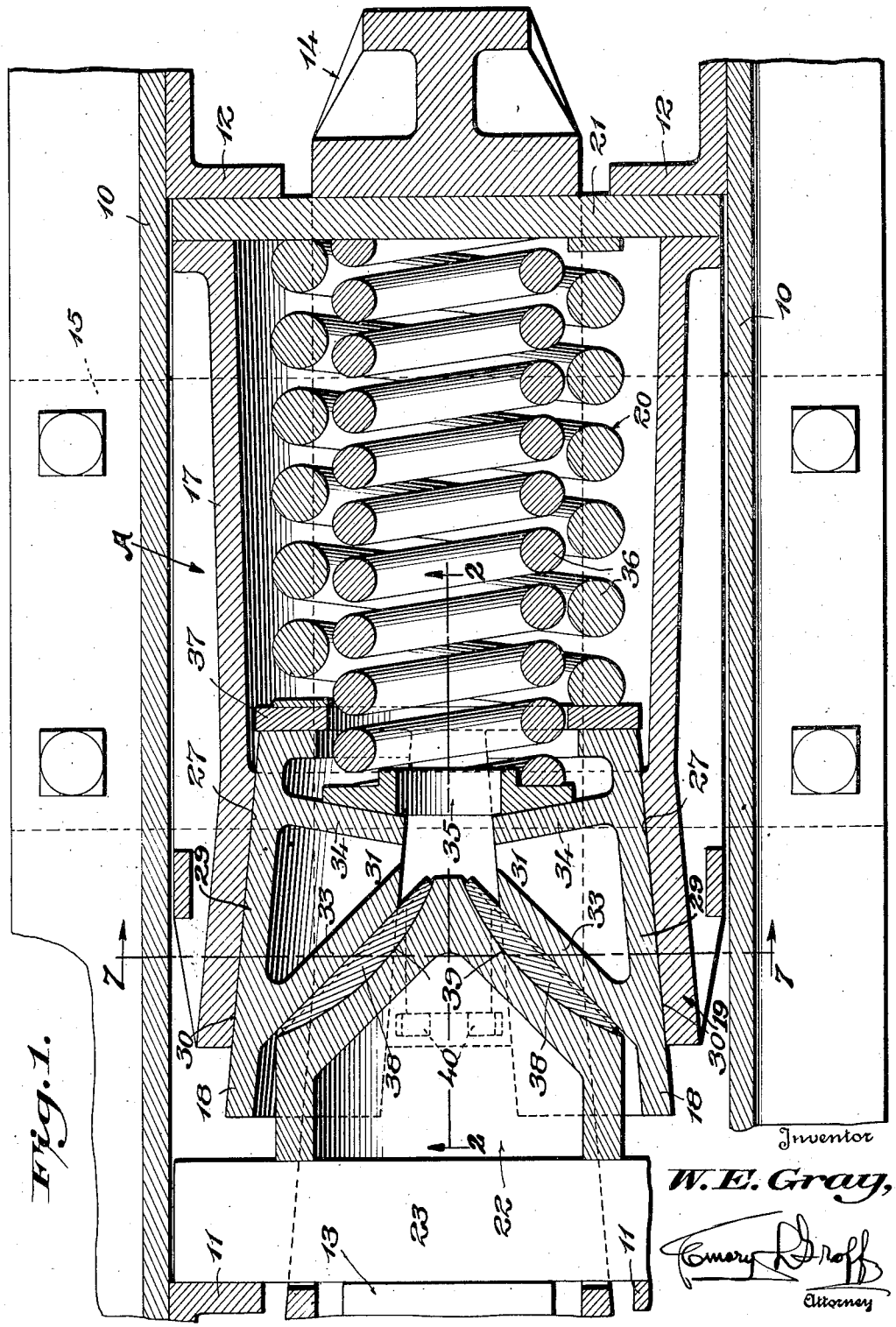

2,417,410

UNITED STATES PATENT OFFICE 2,417,410

DRAFT GEAR

William E. Gray, West Lafayette, Ind., assignor to Peerless Equipment Company, Chicago, Ill., a corporation of Delaware Application September 2, 1944, Serial No. 552,511

10 Claims. (Cl. 213—34)

This invention relates to draft gears of the type used on railway cars to frictionally absorb draft and buffing shocks to which the cars are subjected.

More particularly the invention has reference to improvements in friction draft gears, comprising, generally, a housing having friction surfaces converging longitudinally thereof, friction shoes for cooperation with said surfaces, a wedge for cooperation with said shoes under draft and buffing loads imposed upon the gear to shift said shoes longitudinally of the housing in the direction of convergence of said friction surfaces and simultaneously to urge said shoes outwardly against said surfaces, and yieldable means tending constantly to shift said shoes longitudinally of the housing in the opposite direction, whereby the gear is caused frictionally to absorb draft and buffing loads imposed thereon and is released upon release of such loads.

The general objects of the invention are to provide a draft gear of the type set forth which—is highly efficient in the use of metal and is of high capacity, whereby it may be exceptionally light in weight for any given capacity; embodies an exceptionally few number of parts which are of simple design and capable of being readily and easily produced and assembled, thereby to effect low production cost; is strong, sturdy, and has large friction areas with provision for overriding of surfaces to prevent shouldering, thus materially contributing to long life; is of low maintenance cost; embodies novel means to insure proper coaction of its parts; operates with high efficiency and is constructed to practically and effectively insure its easy release whenever it is relieved of draft or buffing forces; and is thoroughly reliable in service.

Another and more specific object of the invention is to provide a housing with a friction zone of novel shape, including curved and straight portions merging into each other in such a manner as to eliminate sharp corners where stresses would otherwise be concentrated, thereby to render the housing well adapted to withstand bursting stresses set up during gear closure. In that connection, it is proposed to provide friction surfaces and matching shoes having relatively straight side portions joined by cylindrical portions centered on the long axis of the entire section, whereby the shoes fit the friction surfaces of the housing regardless of their change in position as they slide in and out of the housing during gear operation. Moreover, the straight portions and the cylindrical portions permit of attaining the desired pitch for the engaging surfaces without resorting to conical surfaces which are not adapted to slide over each other and do not maintain full contact in all positions.

A further object is to provide a draft gear having a housing, which when subjected to stress set up in the direction of the major axis of the friction zone, due to gear closing, will cause the housing to contract in the direction of its minor axis, thereby tending to increase the radial pressure on the straight portions of the shoes and result in higher gear capacity. As soon as closing pressure on the gear is removed, the housing will resume its unstressed state and reduce the radial pressure on the straight portion of the shoes, thereby facilitating release of the gear.

A still further object of the invention is to provide spherically seated wedge equalizers between the wedge and the shoes, thereby making it possible for these parts of the gear to adjust or accommodate themselves to any unavoidable manufacturing variations in the dimension of parts. These equalizers also have the advantage of maintaining alignment between the wedge and the front follower in the draft gear pocket and also enable the friction shoes to line themselves with the friction surfaces of the housing. Moreover, should the gears receive angular blow, these equalizers will afford a means of the wedge accommodating itself to the direction of this blow without destroying plane contact between the shoes and the equalizers.

With the foregoing and other objects in view, which will become more fully apparent as the nature of the invention is better understood, the same consists in the novel features of construction, combination and arrangement of parts hereinafter more fully described, illustrated, and claimed.

In the accompanying drawings, wherein like characters of reference denote corresponding parts in the different views:

Figure 1 is a central, longitudinal section through a draft gear constructed in accordance with one practical embodiment of the invention.

Figure 2 is a fragmentary central, longitudinal section on the line 2—2 of Fig. 1, the wedge being shown in side elevation.

Figure 3 is a cross section on the line 3—3 of Fig. 2.

Figure 4 is an end view of the housing with the friction shoes removed therefrom.

Figure 5 is an inner end elevation of one of the friction shoes.

Figure 6 is an inside elevation of one of the friction shoes.

Fig. 7 is a cross section on the line 7—7 of Fig. 1.

Fig. 8 is an elevation of the wedge looking toward the inner end thereof.

Fig. 9 is a front elevation of one of the disks which are interposed between the wedge and the friction shoes.

Fig. 10 is an edge view of the disk shown in Fig. 9; and

Fig. 11 is a side elevation of the wedge.

Referring to the drawings in detail, 10, 10 designate the usual draft or center sills of a car underframe structure; 11 and 12 designate front and rear stop lugs, respectively, carried by said sills; 13 designates a portion of a draw-bar having operatively associated therewith a yoke designated as 14, and A designates, generally, the present gear proper supported in its pocket between the sills 10, 10 and between the stop lugs 11 and 12 by means of a saddle plate designated as 15, all in accordance with well known practice.

The gear proper, A, comprises, generally speaking, a housing, designated as 17; a pair of friction shoes 18, 18 disposed in the open front end portion 19 of said housing; one or more helical springs or equivalent yieldable means 20 in said housing between the closed rear end 21 thereof and the shoes 18 tending constantly to urge said shoes forwardly relative to said housing, and a wedge 22 for urging said shoes outwardly and rearwardly relative to said housing, all likewise in accordance, generally speaking, with well known practice.

A main front follower 23 is interposed as usual between the wedge 22 and the front stop lugs 11 and in conjunction with said stop lugs constitutes stop means to limit forward movement of said wedge. Moreover, the draw-bar 13 is operatively associated with said main front follower in accordance with known practice so that buffing or rearwardly directed forces imposed upon said draw-bar are transmitted through said main front follower to said wedge 22. On the other hand, there may be a main rear follower similar to the main front follower 23 between the rear of the housing 17 and the rear stop lugs 12 and the rear of the yoke 14 in accordance with known practice, or said rear stop lugs and the rear of said yoke may cooperate directly with the rear of said housing as shown. In any event, when draft or forwardly directed forces are imposed upon the yoke 14 the housing 17 is urged forwardly by said yoke, but since the wedge 22 is held against forward movement by the front stop lugs 11 and the main front follower 23, the result is that said wedge is caused to act to urge the friction shoes 18 both outwardly into tight engagement with the housing 17 and rearwardly with respect thereto, whereby the said draft or forwardly directed forces are frictionally absorbed. Conversely, when buffing or rearwardly directed forces are imposed upon the draw-bar 13, the main front follower 23 and the wedge 22 are urged rearwardly, but since in this case the housing 17 is held against rearward movement by the rear stop lugs 12, the result is, in effect, the same as results from draft or forwardly directed forces being imposed upon the gear; i. e., the wedge 22 is caused to act to urge the friction shoes 18 both outwardly into tight engagement with the housing 17 and rearwardly with respect thereto, whereby the said buffing or rearwardly directed forces are frictionally absorbed. Moreover, in each instance the yieldable means 20, which is under compression normally, further is compressed and acts, upon release of the draft or buffing force, as the case may be, to return the friction shoes and the wedge to their normal or forwardmost positions relative to the housing 17. All of this, generally speaking, is in accordance with well known practice.

Referring now more particularly to the gear proper, A, with which the present invention particularly is concerned, it will be observed that the open front end portion 19 of the housing 17 is of generally oval shape in cross section and is regularly rounded at the ends of both its major and its minor axes, as indicated at 24 and 25, respectively. It will further be observed that the rounded portions 24 and 25 are joined by connecting portions 26 which, cross sectionally of the housing 17, flare from the rounded portions 24 toward the rounded portions 25 and which, in the particular example illustrated in the drawing, are straight or flat and are disposed tangentially with respect to said rounded portions. As will hereinafter become apparent, however, the connecting portions 26 are not necessarily straight or flat, but may be slightly curved outwardly if desired. In any event, the rounded portions 24 are provided with internal friction surface 27 of any suitable length which extend longitudinally of the open end portion 19 and preferably are of cylindrical form and converge inwardly relative to said open end portion. Moreover, the connecting portions 26 are provided with internal friction surfaces 28 which may be either flat or curved outwardly and which, in any event, constitute smooth continuations of the cylindrical surfaces 27 and cross sectionally of the housing 17 are flared with respect thereto.

Only two friction shoes 18 are provided and these are disposed in the open end portion 19 at the ends of its major axis, respectively. These shoes preferably are sufficiently longer than the friction surfaces 27 and 28 to extend at all times beyond the ends of said surfaces and thereby preclude the possibility of the wearing of said surfaces in a manner to form shoulders which might interfere with the proper coaction of said shoes with said surfaces. The shoes 18 may, however, be of the same or of lesser length than the friction surfaces 27, 28 if desired. In any event, each shoe includes an outer, transversely rounded portion 29 having an outer preferably cylindrical friction surface 30 which complements and constantly is engaged with the related friction surface 27 of the open end portion 19 of the housing 17, and further includes a pair of side or wing portions 31 which extend inwardly from the rounded portion 29 and cross-sectionally of the shoe, are flared with respect thereto and have outer friction surfaces 32 which complement and constantly are engaged with the friction surfaces 28, 28, respectively, the said friction surfaces 32 constituting, of course, smooth, flared continuations of the friction surface 30 and being either flat or curved depending upon whether said friction surfaces 28, 28 are flat or curved.

While the shoes 18 may be of either solid or hollow form, they preferably are of light-weight, hollow form and are reinforced by front and rear transverse webs 33 and 34, respectively. The rear webs 34, 34 of the two shoes have forwardly and inwardly inclined rear faces against which is seated a disk 35 which, in turn, has seated against the rear face thereof the front end of the smaller or inner of two coaxial helical springs 36, 36 constituting, in the illustrated embodiment of the invention, the yieldable means 20 for urging said shoes forwardly. The other or larger of said springs seats at its front end against a ring 37 which is engaged with the rear ends of the shoes 18, and both springs seat at their rear ends against the rear end wall 21 of the housing 17, whereby they react from said wall to accomplish their purpose.

The front faces of the front webs 33 are inclined rearwardly and inwardly and the rear end portion of the wedge 22 is provided with rearwardly and inwardly inclined faces which are opposed to said web front faces and which they may directly engage if desired. Preferably, however, spherical segments 38 are interposed between the webs 33 and the related rear faces of the wedge 22, respectively, and are self-adjusting to insure proper seating cooperation between the front faces of said webs and the related rear faces of said wedge at all times. To this end, the front faces of the webs 33 and the rear faces of the spherical segments 38 may be flat, while the front faces of said spherical segments may be of spherical contour and may be seated in recesses 39 of corresponding spherical contour in the rear of the wedge 22 as shown. Alternatively, the rear faces of said spherical segments may be of spherical contour and may be seated in recesses of corresponding spherical contour in the fronts of the webs 33 and the fronts of said spherical segments may be flat and may be seated flatly against the rear of the wedge. In either case, the disks 38 obviously will accommodate themselves to any misalinement of the wedge and the shoes as well as compensate for any unavoidable manufacturing variations in dimensions of parts and thus will insure proper seating cooperation between said wedge and said shoes at all times. If desired, only a single spherical segment 38 may be used in lieu of the two spherical segments shown. Two spherical segments are preferred, however, as affording a better balanced structure.

While any suitable means may be provided to maintain the parts of the gear proper, A, assembled as a unit, one practical means for this purpose may comprise a stop lug or lugs 40 projecting inwardly from the open end portion 19 of the housing 17 at each end of its minor axis and near the front end thereof, and cooperating lugs 41 on the wedge 22 at opposite sides thereof.

The free edges of the side or wing portions 31 of the two shoes 18, 18 are spaced apart and between the said free edges of said side or wing portions the open end portion 19 of the housing 17 is devoid of any obstruction to contraction of the said open end portion of said housing along its minor axis. In this connection it is apparent that, due to the connecting portions 26 of the open end portion 19 of the housing being flared with respect to the rounded end portions 24 thereof, outward pressure exerted along the major axis of said open end portion 19 will result in contraction of said open end portion along its minor axis. In this connection, the shoes 18 are, as aforesaid, disposed at the ends of the major axis of the open end portion 19. Moreover, they are urged outwardly or apart by the wedge 22 under draft or buffing forces imposed upon the gear. Accordingly, in response to either draft or buffing forces imposed upon the gear, the front end portion 19 of the housing 17 is elongated along its major axis and is contracted along its minor axis with the result that there is an intensification of pressure and increased friction between the friction surfaces 28 and 32 proportional to the draft or buffing force imposed upon the gear. Conversely, when the draft or buffing force is released, expansion or return of the front end portion 19 along its minor axis to its normal, unstressed condition results in positive release of the friction shoes 18 for return of the same to their normal forwardmost positions by the yieldable means 19.

Summarizing, it is apparent that the present gear proper is of exceptionally simple construction and is of low production cost due to the few simple parts of which it is composed; that it is highly efficient due to the large areas of its friction surfaces, to its provision to insure proper seating of its parts, and to its described mode of operation; that it is well designed to withstand bursting stresses due to the rounding of its open end portion 19 at the ends of its major and minor axes and the consequent elimination of more or less sharp corners where stresses might concentrate, and that it is of strong, rugged design and therefore will possess long life with little or no maintenance attention.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:

1. A draft gear comprising a housing having an open end portion of generally oval form in cross section rounded at the ends of its major and minor axes and including connecting portions between said rounded portions flared cross sectionally of the housing with respect to the rounded portions at the ends of the major axis of said open end portion, the rounded portions at the ends of the major axis of said open end portion having internal friction surfaces of cylindrical form extending longitudinally of the housing and converging inwardly relative thereto, said connecting portions having internal friction surfaces constituting continuations of said first mentioned friction surfaces and flared cross sectionally of the housing with respect thereto, a pair of friction shoes having outer friction surfaces of cylindrical form complementing and constantly engaged with said first mentioned friction surfaces of said open end portion, respectively, and further having side portions with outer flared friction surfaces complementing and engaged with the flared inner friction surfaces of said connecting portions, and means operable in response to draft and buffing forces imposed upon the gear to cause said shoes to exert outward pressure upon and to elongate the open end portion of said housing along its major axis and to contract the same along its minor axis, thereby to cause said connecting portions to exert inward pressure against the said side portions of said shoes.

2. A draft gear comprising a housing having an open end portion of generally oval form in cross section rounded at the ends of its major and minor axes and including connecting portions between its said rounded portions flared cross sectionally of the housing with respect to the rounded portions at the ends of the major axis of said open end portion, the rounded portions at the ends of the major axis of said open end portion having internal friction surfaces of cylindrical form extending longitudinally of said open end portion and converging inwardly relative thereto, said connecting portions having internal friction surfaces constituting continuations of said first mentioned friction surfaces and flared cross sectionally of the housing with respect thereto, only two friction shoes in said open end portion of said housing disposed at the ends of its major axis, respectively, and having outer friction surfaces of cylindrical form complementing and constantly engaged with said first mentioned friction surfaces of said open end portion, respectively, said shoes further having side portions with outer flared friction surfaces complementing and engaged with the flared inner friction surfaces of said connecting portions, said shoes being spaced apart and the open end portion of said housing between said shoes being devoid of obstruction to contraction of said open end portion along its minor axis, and means operable in response to draft and buffing forces imposed upon the gear to cause said shoes to exert pressure upon and to elongate the open end of said housing along its major axis and to contract the same along its minor axis, thereby to cause said connecting portions to exert inward pressure against the said side portions of said shoes.

3. A draft gear comprising a housing having an open end portion of generally oval form in cross section rounded at the ends of its major and minor axes and including straight connecting portions said rounded portions, said straight connecting portions being flared cross sectionally of the housing with respect to the rounded portions at the ends of the major axis of said open end portion and also being disposed tangentially with respect to said rounded portions, the rounded portions at the ends of the major axis of said open end portion having internal friction surfaces of cylindrical form extending longitudinally of said open end portion and converging inwardly relative thereto, said connecting portions having flat internal friction surfaces flared cross sectionally of the housing and disposed tangentially with respect to said first mentioned friction surfaces and constituting continuations of the latter, only two friction shoes in said open end portion of said housing disposed at the ends of its major axis, respectively, and having outer friction surfaces of cylindrical form complementing and constantly engaged with the first mentioned friction surfaces of said open end portion, respectively, said shoes further having side portions with flat outer friction surfaces flared and disposed tangentially with respect to the cylindrical friction surfaces thereof and complementing and engaged with the flat internal friction surfaces of said connecting portions, and means operable in response to draft and buffing forces imposed upon the gear to cause said shoes to exert outward pressure upon and to elongate the open end portion of said housing along its major axis and to contract the same along its minor axis, thereby to cause said connecting portions to exert inward pressure against the said side portions of said shoes.

4. A draft gear as set forth in claim 1 in which the open end portion of the housing is of identical reversed contour in cross section to either side of both its major and its minor axes.

5. A draft gear as set forth in claim 3 in which the open end portion of the housing is of identical reversed contour in cross section to either side of both its major and its minor axes.

6. A draft gear comprising a housing having an open end portion provided with internal inwardly converging friction surfaces, friction shoes in said open end portion having outer friction surfaces complementing and engaged with the friction surfaces of said open end portion, respectively, said shoes having flat inwardly converging forwardly facing surfaces, a wedge having recesses of spherical contour opposed to said last mentioned surfaces of said shoes, respectively, and spherical segments interposed between said wedge and said shoes, respectively, each spherical segment having a flat face engaged with the said flat face of the related shoe and an opposite face of spherical contour complementing and engaged in the related recess of said wedge.

7. A draft gear comprising a housing having an open end portion provided with internal inwardly converging friction surfaces, friction shoe elements in said open end portion having outer friction surfaces complementing and engaged with the friction surfaces of said open end portion, respectively, a wedge element, and spherical segments between said wedge element and said shoe elements, respectively, each spherical segment having at one side thereof planar contact with one of said elements and at the opposite side thereof having spherical contact with the other of said elements.

8. A draft gear comprising a housing having an open end portion of generally oval form in cross section rounded at the ends of its major and minor axes and including connecting portions between said rounded portions flared cross sectionally of the housing with respect to the rounded portions at the ends of the major axis of said open end portion, the rounded portions at the ends of the major axis of said open end portion having internal transversely rounded friction surfaces which extend longitudinally of the housing and are uniformly rounded throughout their lengths, said connecting portions having internal friction surfaces constituting continuations of said first mentioned friction surfaces and flared cross sectionally of the housing with respect thereto, a pair of friction shoes disposed in the open end portion of said housing and having outer rounded friction surfaces complementing and constantly engaged with the rounded internal friction surfaces at the ends of the major axis of the said open end portion of said housing, respectively, and further having side friction surfaces complementing and engaged with the internal friction surfaces of said connecting portions, and means operable in response to draft and buffing forces imposed upon the gear to urge said shoes apart and into the open end portion of said housing.

9. A draft gear comprising a housing having an open end portion of generally oval form in cross section rounded at the ends of its major and minor axes and including connecting portions between said rounded portions flared cross sectionally of the housing with respect to the rounded portions at the ends of the major axis of said open end portion, the rounded portions at the ends of the major axis of said open end portion having internal transversely rounded friction surfaces which extend longitudinally of the housing in converging relationship to each other inwardly with respect to said housing and are uniformly rounded throughout their lengths, said connecting portions having internal friction surfaces constituting continuations of said first-mentioned friction surfaces and flared cross sectionally of the housing with respect thereto, a pair of friction shoes disposed in the open end portion of said housing and having outer rounded friction surfaces complementing and constantly engaged with the rounded internal friction surfaces at the ends of the major axis of the said open end portion of said housing, respectively, and further having side friction surfaces complementing and engaged with the internal friction surfaces of said connecting portions, and means operable in response to draft and buffing forces imposed upon the gear to urge said shoes apart and into the open end portion of said housing.

10. A draft gear comprising a housing having an open end portion provided with internal friction surfaces converging inwardly relative to each other longitudinally with respect to said housing, said friction surfaces being uniformly rounded transversely throughout their lengths, friction shoes disposed in said front end portion and having external friction surfaces conforming to and engaged with said housing friction surfaces, and means including a wedge between said friction shoes operable in response to draft and buffing forces imposed upon the gear to urge said shoes apart and into the open end portion of said housing.

WILLIAM E. GRAY.

REFERENCES CITED

The following references are of record in the file of this patent:

UNITED STATES PATENTS

| Number | Name | Date |
|---|---|---|
| 1,200,642 | O'Connor | Oct. 10, 1916 |
| 1,125,109 | Johnson | Jan. 19, 1915 |
| 1,048,729 | O'Connor | Dec. 31, 1912 |
| 945,473 | Nichols | Jan. 4, 1910 |
| 1,254,857 | Sherman | Jan. 29, 1918 |
| 1,251,930 | Sherman | Jan. 1, 1918 |
| 2,222,479 | Cottrell | Nov. 19, 1940 |